US011923166B2

(12) United States Patent
Hayashi et al.

(10) Patent No.: US 11,923,166 B2
(45) Date of Patent: Mar. 5, 2024

(54) GUARD ELECTRODE AND FIELD EMISSION DEVICE

(71) Applicant: MEIDENSHA CORPORATION, Tokyo (JP)

(72) Inventors: Takumi Hayashi, Numazu (JP); Rena Takahashi, Numazu (JP); Hayato Ochi, Numazu (JP)

(73) Assignee: MEIDENSHA CORPORATION, Tokyo (JP)

( * ) Notice: Subject to any disclaimer, the term of this patent is extended or adjusted under 35 U.S.C. 154(b) by 0 days.

(21) Appl. No.: 18/028,174

(22) PCT Filed: Aug. 2, 2021

(86) PCT No.: PCT/JP2021/028525
§ 371 (c)(1),
(2) Date: Mar. 23, 2023

(87) PCT Pub. No.: WO2022/064848
PCT Pub. Date: Mar. 31, 2022

(65) Prior Publication Data

US 2023/0298844 A1 Sep. 21, 2023

(30) Foreign Application Priority Data

Sep. 24, 2020 (JP) ................................ 2020-159212

(51) Int. Cl.
*H01J 35/14* (2006.01)
*H01J 35/06* (2006.01)

(52) U.S. Cl.
CPC ............ *H01J 35/14* (2013.01); *H01J 35/065* (2013.01)

(58) Field of Classification Search
CPC ................................ H01J 35/14; H01J 35/065
See application file for complete search history.

(56) References Cited

U.S. PATENT DOCUMENTS

2011/0115363 A1* 5/2011 Ishiguro ................ H01J 35/065 313/310
2017/0365439 A1 12/2017 Takahashi et al.
(Continued)

FOREIGN PATENT DOCUMENTS

JP 2002-093307 A 3/2002
JP 2010-056062 A 3/2010
(Continued)

OTHER PUBLICATIONS

WO 2017/217051 A1 and its English translation (Year: 2017).*
(Continued)

*Primary Examiner* — Chih-Cheng Kao
(74) *Attorney, Agent, or Firm* — Foley & Lardner LLP

(57) ABSTRACT

In a cylindrical guard electrode (5) provided on the outer peripheral side of an electron generation part (31) of an emitter (3), a distal end section (5A) positioned in the emission direction of an electron beam (L1) from the electron generation part (31) includes: a distal end inner-peripheral-side part (A1) having an inner-peripheral-side curved surface portion (a1) convex in the emission direction; a distal end outer-peripheral-side part (A2) having an outer-peripheral-side curved portion (a2) convex in the emission direction; and a distal end middle part (A3) positioned between the distal end inner-peripheral-side (A1) and the distal end outer-peripheral-side part (A2). The distal end middle part (A3) has a flat surface portion (a3) between the inner-peripheral-surface portion (a1) and the outer-peripheral-side curved surface portion (a2) so as to extend in the direction therebetween.

6 Claims, 10 Drawing Sheets

(56) References Cited

U.S. PATENT DOCUMENTS

| | | | | |
|---|---|---|---|---|
| 2019/0333730 | A1 | 10/2019 | Takahashi et al. | |
| 2019/0341218 | A1* | 11/2019 | Takahashi | H01J 35/16 |

FOREIGN PATENT DOCUMENTS

| | | | |
|---|---|---|---|
| JP | 2011-119084 | A | 6/2011 |
| JP | 2017-228471 | A | 12/2017 |
| KR | 1020190008979 | A | 1/2019 |
| WO | WO-2016/104484 | A1 | 6/2016 |

OTHER PUBLICATIONS

KR 10-2010-0123253 A and its English translation (Year: 2010).*

Office Action issued in corresponding Korean Patent Application No. 10-2023-7010668, with English Machine Translation dated Apr. 25, 2023 (13 pages).

* cited by examiner

GUARD ELECTRODE AND FIELD EMISSION DEVICE

TECHNICAL FIELD

The present invention relates to a guard electrode and field emission device capable of being applied to various apparatuses such as an X-ray device, an electron tube and a lighting apparatus.

BACKGROUND TECHNOLOGY

As an example of a field emission device to be applied to various apparatuses such as an X-ray device, an electron tube and a lighting apparatus, one having a configuration has been known which uses a vacuum vessel in which both ends of a cylindrical insulating body are sealed so as to form a vacuum chamber on the inner peripheral side of the insulating body.

In the vacuum chamber, an emitter (cold cathode; an electron source formed by using carbon and the like) is arranged on one side of the direction toward the both ends of the insulating body (hereinafter is simply referred to as "both-end direction"), and a target (anode) is arranged on the other side of the both-end direction. In addition, by applying voltage between the emitter and the target, an electron beam is emitted to the other side of the both-end direction by field emission of the emitter (emission by generating electrons), and by bringing the emitted electron beam into collision with the target, a desired function (for example, in case of an X-ray device, fluoroscopy resolution by the external emission of X-ray) is exhibited.

In the field emission device mentioned above, improvement in electron beam convergence performance (performance for suppressing the dispersion of the electron beam emitted from the emitter) has been considered, for example, by interposing a grid electrode or the like between the emitter and the target so as to form a triode structure, by forming, in a curved surface shape, the surface of an electron generation part of the emitter (part which is positioned on the side opposite to the target and generates electrons), or by arranging, on the outer peripheral side of the emitter, an guard electrode (guard electrode having a curved surface portion convex on the other side of the both-end direction) having the same potential as that of the emitter (for example, a patent document 1).

In the voltage application mentioned above, it is desirable to emit the electron beam by generating electrons only from the electron generation part of the emitter. However, if unnecessary fine projections or stain exists inside the vacuum chamber, an unintended flashover phenomenon easily occurs and voltage resistant performance and the like cannot be obtained, and there is a possibility that a desired function cannot be exhibited.

As a reason for the occurrence of such a phenomenon, for example, in the guard electrode and the like inside the vacuum chamber (the target, the grid electrode, the guard electrode and the like; hereinafter is simply referred to as a guard electrode and the like), there is a case where a part at which local electric field concentration easily occurs (for example, fine projections or the like formed while processing), a case where gas components (such as gas components remaining inside the vacuum vessel) are adsorbed, or a case where an element which easily generates electrons is contained (case where it is contained in a material to be applied). In case of such a reason, for example, there is also a possibility that an electron generation part is also formed at the guard electrode, and the generation amount of electrons becomes unstable or an electron beam tends to be dispersed, as a result of which, in case, for example, of an X-ray device, the focus deviation of an X-ray occurs.

Therefore, as a technique of suppressing the flashover phenomenon (technique of stabilizing the generation amount of electrons), for example, a technique of performing voltage discharge conditioning processing (modification (regeneration); hereinafter is simply referred to as "modification treatment") has been considered in which voltage application (for example, a high voltage) to the guard electrode and the like is performed (for example, voltage is applied to the guard electrode and the grid electrode), and discharge is repeated (for example, a patent document 2).

PRIOR ART REFERENCE(S)

Patent Document(s)

Patent Document 1: Japanese Patent Application Publication No. 2010-056062
Patent Document 2: Japanese Patent Application Publication No. 2017-228471

SUMMARY OF THE INVENTION

In an emitter, as a technique of adjusting the emitter so as to obtain a desired emission characteristic, for example, it can be cited to change the design of the characteristic of an electron generation part (for example, in case of being formed by using carbon or the like, a carbon membrane structure or the like is changed).

However, since changes of a manufacturing process and the like of the emitter are required, it is necessary to spend a lot of labor and cost, and there is also a possibility of a deterioration in productivity.

On the other hand, according to a technique of changing the design of the shape and the like of a guard electrode which is shown, for example, in the patent document 1, without changing the design of the characteristic of an electron generation part, there is a possibility of adjusting the guard electrode so as to obtain a desired emission characteristic.

However, in case of the design change mentioned above, although there is a possibility that a desired emission characteristic can be obtained, there is also a possibility that electron beam convergence performance deteriorates. Consequently, there is a possibility of a deterioration in field emission properties.

That is, in case of a technique of changing the design of the shape and the like of the guard electrode, a trade-off phenomenon in which one of the emission characteristic and the electron beam convergence performance is lowered (hereinafter is simply referred to as a "trade-off phenomenon") easily occurs, and design change might be required to a plurality of components other than the guard electrode (for example, manufacturing for various components in accordance with the guard electrode after the change). Consequently, similar to the technique of a design change in the characteristic of the electron generation part, it might be necessary to spend a lot of labor and cost, as a result of which productivity deteriorates.

The present invention is made in consideration of such a technical problem, and an object of the present invention is to provide a technique with which adjustment of both of an emission characteristic and electron beam convergence performance can be performed easier.

A guard electrode and a field emission device according to the present invention are ones capable of contributing to solving the problem. In one aspect of the guard electrode, a guard electrode having a cylindrical shape and provided on an outer peripheral side of an electron generation part of an emitter includes a distal end section positioned in an emission direction of an electron beam from the electron generation part, wherein the distal end section includes: a distal end inner-peripheral-side part having an inner-peripheral-side curved surface portion convex to the emission direction; a distal end outer-peripheral-side part having an outer-peripheral-side curved surface portion convex to the emission direction; and a distal end middle part positioned between the distal end inner-peripheral-side part and the distal end outer-peripheral-side part, and having a flat surface portion between the inner-peripheral-side curved surface portion and the outer-peripheral-side curved surface portion, the flat surface portion extending in a direction therebetween.

In addition, when a size of a curvature radius of the inner-peripheral-side curved surface portion is set as r1, and a size of a curvature radius of the outer-peripheral-side curved surface portion is set as r2, a relational expression of r1≤r2 may be satisfied.

In addition, the distal end outer-peripheral-side part may project in the emission direction more than the distal end middle part.

In addition, the flat surface portion may extend in a direction crossing an axis of the guard electrode at an inclined angle.

In addition, the distal end inner-peripheral-side part may have a shape projecting toward an axis of the guard electrode, and may be superimposed on an outer-peripheral-side portion of the electron generation part in an axial direction of the guard electrode.

A field emission device, in one aspect thereof, is one which includes: a vacuum vessel in which both ends of a cylindrical insulating body are sealed so as to form a vacuum chamber on an inner peripheral side of the insulating body; the emitter positioned on one side of a direction toward the both ends in the vacuum chamber, and supported via a bellows which is expandable in the both-end direction, so as to be movable in the direction toward the both ends; and a target positioned on an other side of the direction toward the both ends in the vacuum chamber, and provided so as to face the other side of the direction toward the both ends in the emitter, wherein the emitter is provided with the electron generation part on a side facing the target, and the guard electrode is provided on the outer peripheral side of the electron generation part of the emitter.

In addition, the field emission device may be one in which a grid electrode having an arc horn structure is provided between the emitter and the target in the vacuum chamber, and the flat surface portion of the guard electrode extends in a direction crossing an axis of the guard electrode at an inclined angle, such that a point on the flat surface portion moves toward the other side of the direction toward the both ends as it approaches a distal end outer-peripheral-side part side from a distal end inner-peripheral-side part side.

According to the present invention mentioned above, it is possible to contribute to facilitate adjustment of both of an emission characteristic and electron beam convergence performance.

MODE FOR IMPLEMENTING THE INVENTION

Figure 1:
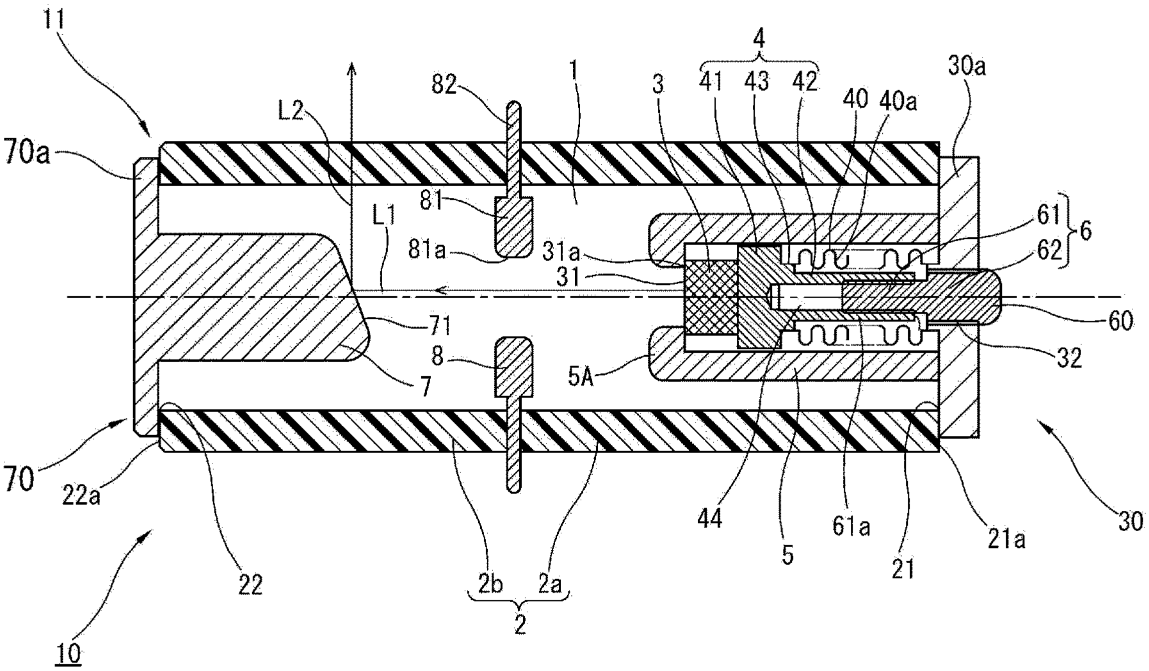
FIG. 1 is a schematic block diagram (sectional view along the both-end direction of a vacuum chamber 1) for explaining an X-ray device 10 in first to third embodiments.

A guard electrode and a field emission device in embodiments of the present invention are totally different from a guard electrode shown, for example, in the patent document 1 which has a simple structure having a curved surface portion convex to the other side of the both-end direction.

That is, a guard electrode in the present embodiments is one provided with a distal end section positioned in the emission direction of an electron beam from an electron generation part (hereinafter is simply referred to as an "emission direction"), wherein the distal end section includes: a distal end inner-peripheral-side part having an inner-peripheral-side curved surface portion convex in the emission direction; a distal end outer-peripheral-side part having an outer-peripheral-side curved surface portion convex in the emission direction; and a distal end middle part positioned between the distal end inner-peripheral-side part and the distal end outer-peripheral-side part, and having a flat surface portion between the inner-peripheral-side curved surface portion and the outer-peripheral-side curved surface portion, the flat surface portion extending in the direction therebetween.

According to such a configuration, the distal end inner-peripheral-side part contributes to electron beam convergence performance, and the distal end middle part and the distal end outer-peripheral-side part contribute to an emission characteristic.

Here, for example, by appropriately changing the design of the width in the extending direction of the flat surface portion of the distal end middle part, or by appropriately changing the design of the curvature radius of the outer-peripheral-side curved surface portion, a desired emission characteristic can be obtained. On the other hand, for example, by adjusting the curvature radius of the inner-peripheral-side curved surface portion, a desired beam convergence performance can be obtained.

That is, according to the guard electrode of the present embodiments, design change of the distal end section of the guard electrode can be performed while suppressing the trade-off phenomenon, and, for example, without performing design change of components other than the guard electrode, the emission characteristic and the electron beam convergence performance each can be easily adjusted as desired.

In the present embodiments, the distal end section positioned in the emission direction in the guard electrode is configured to include the distal end inner-peripheral-side part, the distal end outer-peripheral-side part and the distal end middle part mentioned above, and it is sufficient to have a configuration in which, by performing design change of the distal end inner-peripheral-side part, the distal end outer-peripheral-side part and the distal end middle part, an emission characteristic and electron beam convergence performance can be adjusted, and it is possible to appropriately apply common general knowledge of various fields (such as a field emission device field and a carbon nanotube field) to the embodiments. For example, design change can be performed by appropriately referring to the patent documents 1 and 2 as needed, and, as one example thereof, the following first to third embodiments can be cited.

In addition, in the following first to third embodiments, for example, the same reference numbers designate the same components throughout the redundant contents, and the detail explanation is appropriately omitted.

Moreover, for convenience, the direction toward the both ends of the after-mentioned vacuum vessel 11 (corresponding to the axial direction of the after-mentioned guard electrode 5) is simply referred to as a "both-end direction". In addition, one side of the both-end direction is simply referred to as a "both-end one side", and the other side of the both-end direction (that is, the emission direction side of the after-mentioned electron beam L1) is simply referred to as a "both-end other side".

First Embodiment

<Schematic configuration of X-ray device 10>

Figure 2:
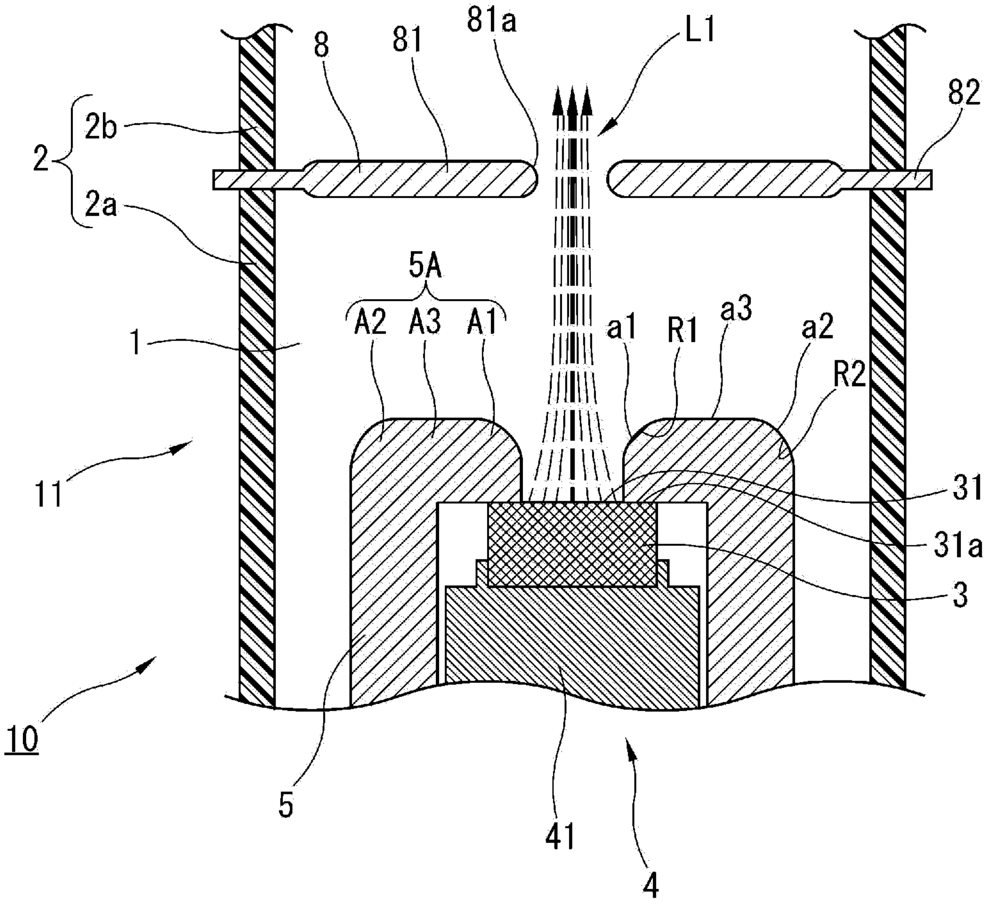
FIG. 2 is an enlarged view (sectional view corresponding to an enlarged view of part of FIG. 1) for explaining a guard electrode 5 and the surroundings of the guard electrode 5 in the first embodiment.
Figure 3:
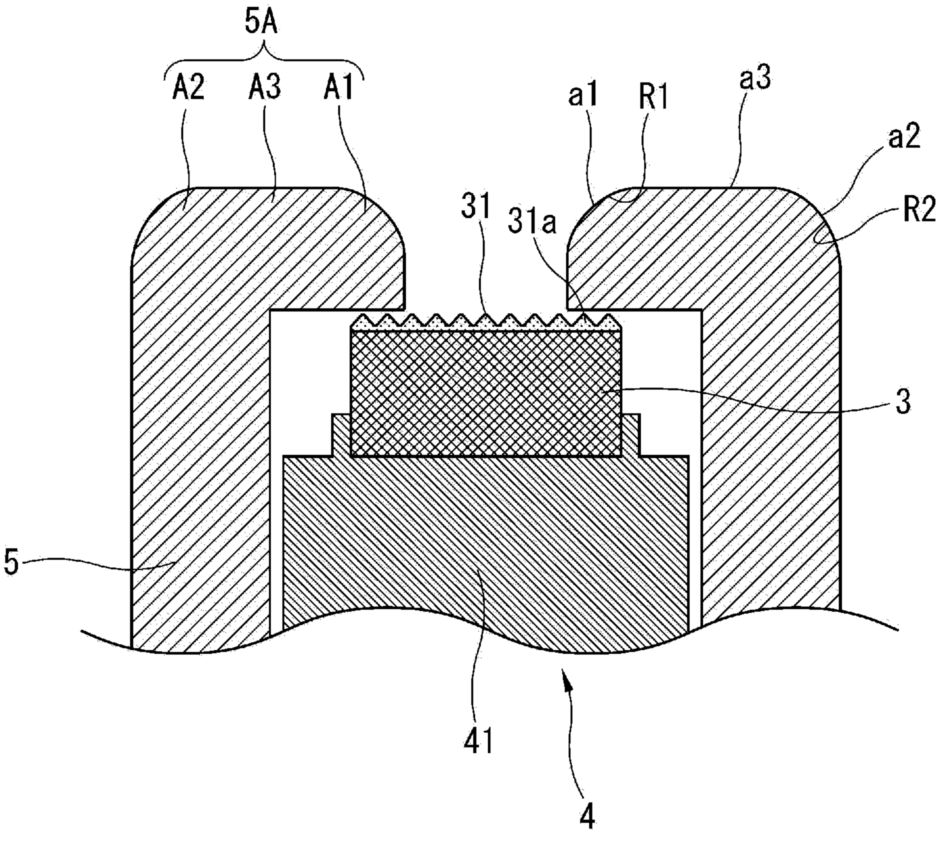
FIG. 3 is an enlarged view (sectional view corresponding to an enlarged view of part of FIG. 1) for explaining the guard electrode 5 and the surroundings of the guard electrode 5 in the first embodiment.

FIGS. 1 to 3 are ones for explaining the schematic configuration of an X-ray device 10 in a first embodiment. In the X-ray device 10, an opening 21 on the both-end one side and an opening 22 on the both-end other side of a cylindrical insulating body 2 are sealed with an emitter unit 30 and a target unit 70 respectively (they are sealed, for example, by brazing), so as to form a vacuum vessel 11 having a vacuum chamber 1 on the inner peripheral side of the insulating body 2.

A grid electrode 8 extending in the cross-sectional direction of the vacuum chamber 1 (direction crossing the both-end direction of the vacuum vessel 11; hereinafter is simply referred to as a "cross-sectional direction") is provided between the emitter unit 30 and the target unit 70 (between the after-mentioned emitter 3 and target 7).

The insulating body 2 is made of an insulating material such as ceramic, and if it is one capable of forming the vacuum chamber 1 thereinside while insulating the emitter unit 30 (after-mentioned emitter 3) and the target unit 70 (after-mentioned target 7) from each other, various modes can be applied. For example, as illustrated, one having a configuration can be cited in which, in a state in which the grid electrode 8 (for example, the after-mentioned lead terminal 82) is interposed between two cylindrical insulating members 2*a* and 2*b* continuously and coaxially arranged in the axial direction, both of the insulating members 2*a* and 2*b* are assembled, for example, by brazing.

The emitter unit 30 is provided with a flange portion 30*a* which is supported on an end surface 21*a* of the opening 21 of the insulating body 2 so as to seal the opening 21, an emitter 3 including an electron generation part 31 at a part which faces the target unit 70 (after-mentioned target 7), a movable emitter supporting part 4 which supports the emitter 3 so as to be movable in the both-end direction, and a guard electrode 5 positioned on the outer peripheral side of the electron generation part 31 of the emitter 3.

In the emitter 3, if it is one (radiator) which includes the electron generation part 31 as mentioned above so as to be able to emit an electron beam L1 as illustrated by generating electrons from the electron generation part 31 by voltage application, various modes can be applied. As a specific example, the emitter 3 can be applied which is made of a material such as carbon (for example, carbon nanotube), and is formed in a lump shape as illustrated or is deposited so as to be a thin film shape. In the electron generation part 31, it is preferable to form the surface on the side facing the target unit 70 (after-mentioned target 7) of the electron generation part 31 into a concave shape (curved surface shape) so as to easily focus the electron beam L1.

The emitter supporting part 4 is supported on the flange portion 30*a* via a bellows 40 which is expandable in the both-end direction, so as to be movable in the both-end direction via the after-mentioned position adjustment shaft 6.

In case of the emitter supporting part 4 in the drawings, the emitter supporting part 4 is provided with a body portion 41 which supports both-end one side of the emitter 3 on the inner peripheral side of the guard electrode 5 (for example, it supports the opposite side of the electron generation part 31 in the emitter 3 by caulking, welding or the like), and a columnar portion 42 which extends in the both-end direction on the both-end one side of the body portion 41, and has a diameter smaller than that of the body portion 41. In addition, a stepped portion 43 is formed on the outer peripheral surface between the body portion 41 and the columnar portion 42.

In the columnar portion 42, an emitter supporting part female screw hole 44 of which the screw axis extends in the both-end direction is provided thereto in a shape of being opened to the both-end one side direction.

In addition, although the emitter supporting part 4 can be configured by applying various materials and it is not limited, one configured by using a conductive metal material such as stainless (for example, SUS material) and copper can be cited.

The bellows 40 has a cylindrical shape having a diameter larger than that of the columnar portion 42 (diameter larger than that of the emitter supporting part female screw hole 44), and the axis of the bellows 40 is arranged so as to extend coaxially with the screw axis of the emitter supporting part female screw hole 44. The end portion on the both-end one side of the bellows 40 is supported on the flange portion 30*a*, and the end portion on the both-end other side is supported on the outer peripheral side (stepped portion 43 in the drawings) of the emitter supporting part 4.

By such a bellows 40, the vacuum chamber 1 and the atmospheric side (outer peripheral side of the vacuum vessel 11) are divided, and thereby the vacuum chamber 1 can be airtightly maintained (configuration which forms part of the vacuum vessel 11). In addition, by supporting the emitter supporting part 4 via the bellows 40, in case of operating the emitter supporting part 4 via the after-mentioned position adjustment shaft 6, the emitter supporting part 4 moves in the both-end direction while the bellows 40 is expanded and contracted, as a result of which the emitter 3 also moves in the both-end direction.

If, as mentioned above, the bellows 40 is one which is expandable in the both-end direction, various modes can be applied thereto, and, for example, one formed by appropriately processing a thin-plate metal material or the like can be cited. As a specific example, as illustrated, a configuration can be cited which has a bellows-like cylindrical wall 40*a* extending in the both-end direction so as to surround the outer peripheral side of the columnar portion 42.

The guard electrode 5 has a cylindrical shape extending in the both-end direction, on the outer peripheral side of the electron generation part 31 of the emitter 3, and the end portion on the both-end one side of the guard electrode 5 is supported more on the outer peripheral side than the bellows 40 in the flange portion 30*a*. A distal end section 5A on the both-end other side of the guard electrode 5 (that is, the distal end section 5A positioned in the emission direction of the electron beam L1; details will be mentioned below) is configured so as to come in contact with and separate from the emitter 3 in accordance with the movement of the emitter supporting part 4 in the both-end direction.

Figure 4:
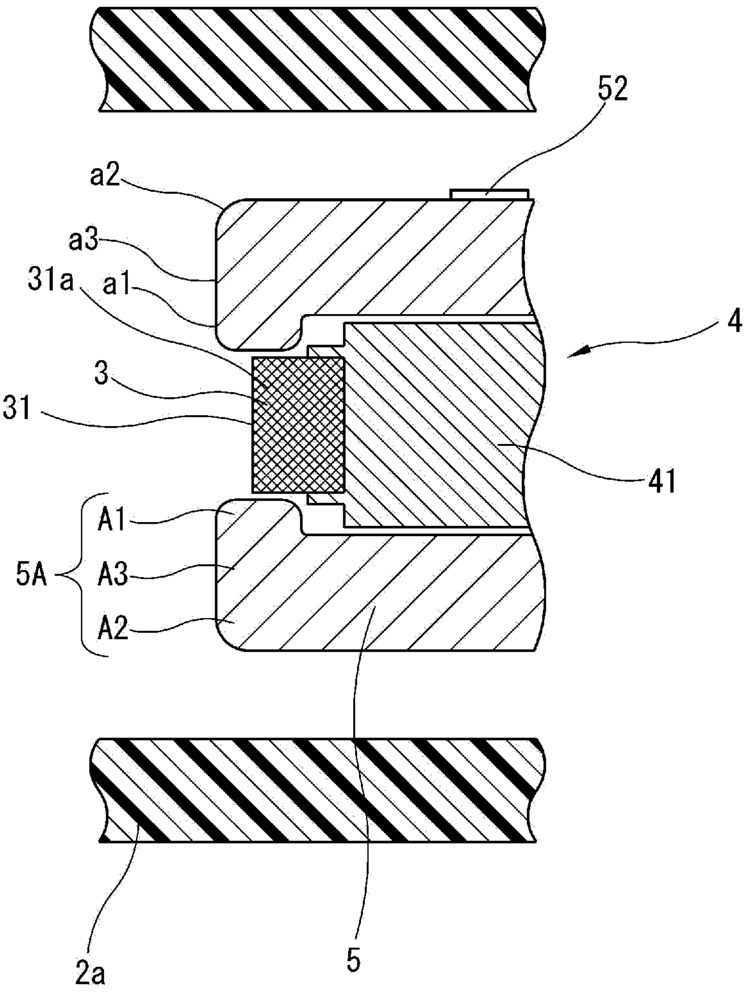
FIG. 4 is a schematic block diagram (sectional view corresponding to an enlarged view of part of FIG. 1) for explaining one example of the guard electrode 5.

The configuration in which the guard electrode 5 comes in contact with and separates from the emitter 3 is especially not limited. For example, the configuration can be cited in which, as shown in FIG. 4, a distal end inner-peripheral-side part A1 of the distal end section 5A is formed in a reduced-diameter shape so as to project toward the axis of the guard electrode 5, and the distal end inner-peripheral-side part A1 having a reduced diameter is formed so as to come in contact with and separate from the emitter 3. In addition, for example, as shown in FIGS. 1 to 3, the configuration may be used in which the distal end inner-peripheral-side part A1 of the distal end section 5A and an outer-peripheral-side portion 31*a* of the electron generation part 31 of the emitter 3 are superimposed on each other in the both-end direction.

In case of the guard electrode 5 having such a configuration, by the movement of the emitter supporting part 4, the emitter 3 moves in the both-end direction on the inner peripheral side of the guard electrode 5, and the electron generation part 31 of the emitter 3 comes in contact with and separates from the distal end section 5A. In addition, in case where the distal end inner-peripheral-side part A1 has a reduced-diameter shape, when the emitter 3 approaches or comes in contact with the distal end section 5A as desired (hereinafter is simply referred to as a "predetermined adjacent state"), the outer-peripheral-side portion 31*a* of the electron generation part 31 is covered with and protected by the distal end inner-peripheral-side part A1.

In addition, the guard electrode 5 is configured to have a shape with which a desired electron beam convergence performance can be obtained. In addition, the guard electrode 5 is configured such that the apparent curvature radius of the outer-peripheral-side portion 31*a* of the electron generation part 31 of the emitter 3 is set large so as to suppress local electric field concentration which may occur at the electron generation part 31 (in particular, the outer-peripheral-side portion 31*a*), or it is formed in a shape with which flashover from the electron generation 31 to another part can be suppressed.

Specifically, in the guard electrode 5, the distal end section 5A including the after-mentioned distal end inner-peripheral-side part A1, distal end outer-peripheral-side part A2 and distal end middle part A3 is formed.

In addition, although, as the guard electrode 5, one made by using a material such as stainless (for example, SUS material) can be cited, the guard electrode 5 is not limited to this.

The flange portion 30*a* is provided with an emitter supporting part operation hole 32 which passes through the position on the inner peripheral side of the bellows 40 in the flange portion 30*a* in the both-end direction, and extends such that the axis thereof is arranged coaxially with the screw axis of the emitter supporting part female screw hole 44. The emitter supporting part operation hole 32 has a shape through which the after-mentioned position adjustment shaft 6 can be inserted from a distal end portion 61 side of the position adjustment shaft 6, such that a base end portion 62 of the position adjustment shaft 6 can be pivotally supported so as to be rotatable.

The position adjustment shaft 6 is provided, on the outer peripheral surface of the distal end portion 61, with a distal-end-portion-side male screw portion 61*a* which can be screwed with the emitter supporting part female screw hole 44 in a state in which the base end portion 62 of the position adjustment shaft 6 is pivotally supported by the emitter supporting part operation hole 32 (state shown in FIG. 1).

The illustrated position adjustment shaft 6 is provided with a head portion 60 having a diameter larger than that of the emitter supporting part operation hole 32 on the both-end one side of the base end portion 62 in the position adjustment shaft 6, so as to be locked with the opening edge surface of the emitter supporting part operation hole 32.

As shown in FIG. 1, in a state in which the distal end portion 61 of the position adjustment shaft 6 which is inserted through the emitter supporting part operation hole 32 is screwed with the emitter supporting part female screw hole 44, for example, a worker grips the head portion 60 to operate the position adjustment shaft 6, and the position adjustment shaft 6 can be axially rotated in the fastening/loosening direction.

For example, when the position adjustment shaft 6 is axially rotated in the fastening direction, the emitter supporting part 4 moves toward the both-end one side. On the other hand, when the position adjustment shaft 6 is axially rotated in the loosening direction, the emitter supporting part 4 moves toward the both-end other side (target 7 side). In addition, by fixing the axial rotation of the position adjustment shaft 6, the emitter supporting part 4 becomes a state in which the position thereof is fixed, namely, the emitter 3 becomes a state in which the position thereof is fixed.

In this way, by appropriately operating the position adjustment shaft 6, the distance between the emitter supporting part 4 (electron generation part 31 of the emitter 3) and the after-mentioned target 7 can be appropriately changed.

Next, the target unit 70 is provided with a target 7 facing the electron generation part 31 of the emitter 3, and a flange portion 70*a* supported on the end surface 22*a* of the opening 22 of the insulating body 2 so as to seal the opening 22.

If the target 7 is one which is capable of emitting an X-ray L2 as illustrated by the collusion of the electron beam L1 emitted from the electron generation part 31 of the emitter 3, various modes can be applied. In the illustrated target 7, a part facing the electron generation part 31 of the emitter 3 is formed with an inclined surface 71 extending in the cross-sectional direction which is inclined with respect to the electron beam L1 at a predetermined angle. When the electron beam L1 collides with the inclined surface 71, the X-ray L2 is irradiated to the direction bent from the irradiation direction of the electron beam L1 (for example, the cross-sectional direction of the vacuum chamber 1 as illustrated).

If the grid electrode 8 is one which is interposed between the emitter 3 and the target 7 as mentioned above so as to appropriately control the electron beam L1 passing though the grid electrode 8, various modes can be applied. For example, as illustrated, a configuration can be cited which is provided with an electrode part 81 (for example, a mesh-like electrode part) which extends in the cross-sectional direction of the vacuum chamber 1, and includes a passing hole 81*a* through which the electron beam L1 passes, and a lead terminal 82 which penetrates the insulating body 2 (penetrating in the cross-sectional direction of the vacuum chamber 1).

According to the X-ray device 10 configured as above, the emitter supporting part 4 appropriately moves in the both-end direction, and the distance between the electron generation part 31 of the emitter 3 and the target 7 can be changed. With this, in the electron generation part 31 of the emitter 3, a state can be switched between a state in which discharge is suppressed (hereinafter is simply referred to as a "discharge suppressing state") and a state in which field discharge of the electron generation part 31 can be carried out (hereinafter is simply referred to as a "dischargeable state").

<Distal end section 5A of guard electrode 5 in first embodiment>

The distal end section 5A of the guard electrode 5 shown in FIGS. 1 to 3 includes a distal end inner-peripheral-side part A1 which is positioned on the inner peripheral side of the guard electrode 5, and has an inner-peripheral-side curved surface portion a1 convex to the both-end other side (projection closer to the inner side in the cross-sectional direction on the both-end other side, in the drawings), a distal end outer-peripheral-side part A2 which is positioned on the outer peripheral side of the guard electrode 5, and has an outer-peripheral-side curved surface portion a2 convex to the both-end other side (projection closer to the outer side in the cross-sectional direction on the both-end other side, in the drawings), and a distal end middle part A3 positioned between the distal end inner-peripheral-side part A1 and the distal end outer-peripheral-side part A2. The distal end middle part A3 includes a flat surface portion a3 extending in the cross-sectional direction between the inner-peripheral-side curved surface portion a1 and the outer-peripheral-side curved surface portion a2.

In such a distal end section 5A, for example, the shape and the like of each of the distal end inner-peripheral-side part A1, the distal end outer-peripheral-side part A2 and the distal end middle part A3 can be appropriately designed and changed in accordance with the X-ray device 10 as an object.

For example, by appropriately changing the design of the width in the cross-sectional direction of the flat surface portion a3 of the distal end middle part A3 (hereinafter is referred to as a "flat surface width") or appropriately changing the design of a curvature radius R2 of the outer-peripheral-side curved surface portion a2, the guard electrode 5 can be adjusted so as to obtain a desired emission characteristic. In addition, for example, by appropriately changing the design of a curvature radius R1 of the inner-peripheral-side curved surface portion a1, the guard electrode 5 can be adjusted so as to obtain a desired electron beam convergence performance.

When the flat surface width of the flat surface portion 3*a* is too narrow, the electron beam convergence performance might deteriorate in case where the design of the curvature radius R2 is changed. In addition, when the flat surface width is too wide, it may cause an increase in the size of the guard electrode 5 and the like. The flat surface width of the flat surface portion a3 is therefore set so as to be wide within a range in which the electron beam convergence performance is not lowered.

In addition, although the size of the curvature radius R1 is appropriately set to a degree at which the apparent curvature radius of the outer-peripheral-side portion 31*a* of the electron generation part 31 of the emitter 3 can be increased, when the size of the curvature radius R1 and the size of the curvature radius R2 are respectively set as "r1" and "r2", they are preferably set so as to satisfy the relational expression of $r1 \leq r2$. With this, there are possibilities that the apparent curvature radius can be increased easier and local electric field concentration and flashover can be suppressed easier.

Figure 5:
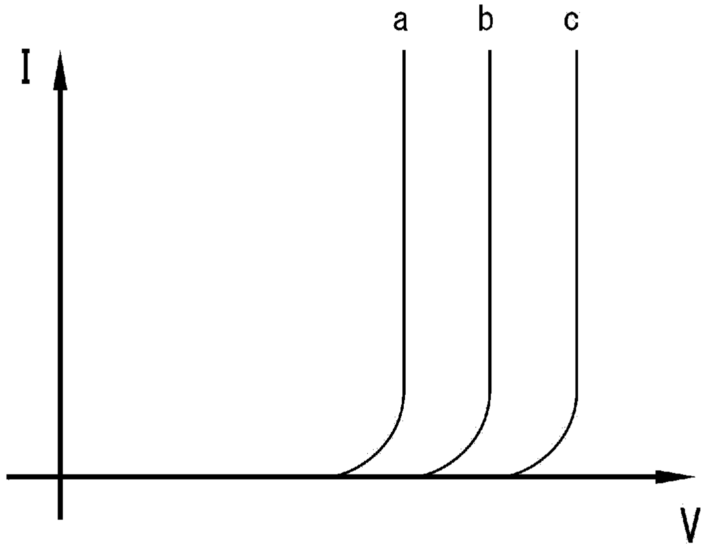
FIG. 5 is a characteristic diagram for explaining one example of an emission characteristic obtained by changing the design of the guard electrode 5.
Figure 6:
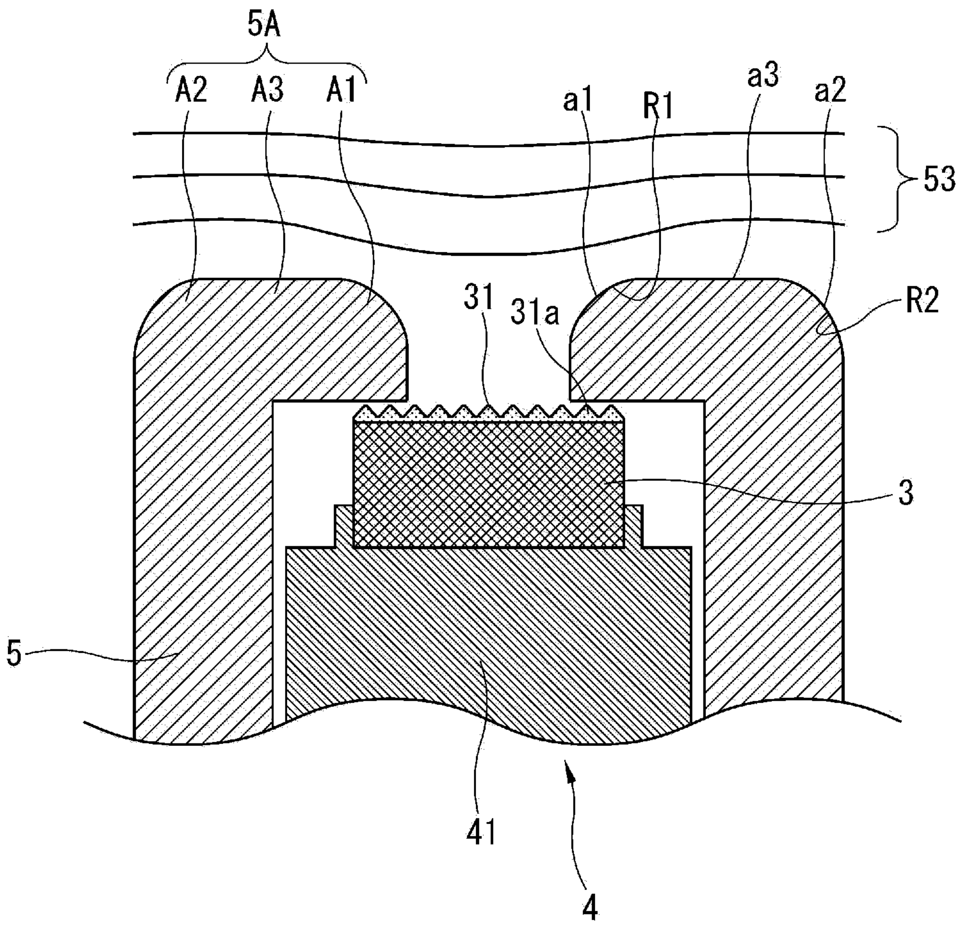
FIG. 6 is a schematic block diagram (sectional view corresponding to an enlarged view of part of FIG. 1) for explaining an equipotential surface by the guard electrode 5.

In the distal end section 5A of the guard electrode 5, when, for example, three design changes mentioned above are carried out, it can be adjusted so as to obtain three emission characteristics having different emission starting voltages as shown by curves "a" to "c" in FIG. 5. In addition, equipotential surfaces in case where the guard electrode 5 is provided become relatively flat as shown in the numeral "53" in FIG. 6.

<One example of modification treatment and field emission method of guard electrode and the like of X-ray device 10>

When the modification treatment is carried out to the guard electrode 5 and the like of the X-ray device 10, first, by appropriately operating the head portion 60 of the position adjustment shaft 6 pivotally supported by the emitter supporting part operation hole 32 while a worker grips the head portion 60, the emitter supporting part 4 moves to the both-end one side, and the electron generation part 31 of the emitter 3 and the distal end section 5A of the guard electrode 5 become a state of separating from each other. That is, the emitter 3 becomes a discharge suppressing state.

In the discharge suppressing state, by appropriately applying a desired modification voltage, for example, between the guard electrode 5 and the grid electrode 8 (such as a lead terminal 82), or between the target 7 and the grid electrode 8, discharge is repeated at the guard electrode 5 and the like, and the modification treatment of the guard electrode 5 and the like is carried out (for example, the surface of the guard electrode 5 is dissolved and smoothened).

In the field emission method after the modification treatment, the position adjustment shaft 6 is operated again so as to move the emitter supporting part 4 to the both-end other side, and, as shown in FIGS. 1 to 4, the electron generation part 31 of the emitter 3 and the distal end section 5A of the guard electrode 5 become a predetermined adjacent state. Consequently, the dispersion of the electron beam L1 emitted from the electron generation part 31 can be suppressed.

In this adjacent state, the electron generation part 31 of the emitter 3 and the guard electrode 5 have the same potential, and by applying a desired voltage, for example, between the emitter 3 and the target 7, electrons are generated from the electron generation part 31 and the electron beam L1 is emitted. Then, the electron beam L1 collides with the target 7, and the X-ray L2 is emitted from the target 7.

According to the first embodiment shown above, by appropriately operating the position adjustment shaft 6 in order to move the emitter supporting part 4 in the both-end direction, a desired modification treatment becomes possible, and a flashover phenomenon (generation of electrons) from the guard electrode 5 in the X-ray device 10 can be suppressed, thereby stabilizing the generation amount of electrons of the X-ray device 10. In addition, the electron beam L1 can be made into focusing-shaped electron flux, the focus of the X-ray L2 can be converged easier, and a high fluoroscopy resolution can be obtained.

In addition, in the distal end section 5A of the guard electrode 5, a design change can be performed while suppressing the trade-off phenomenon, and thereby each of an emission characteristic and electron beam convergence performance can be adjusted easier as desired.

Second Embodiment

Figure 7:
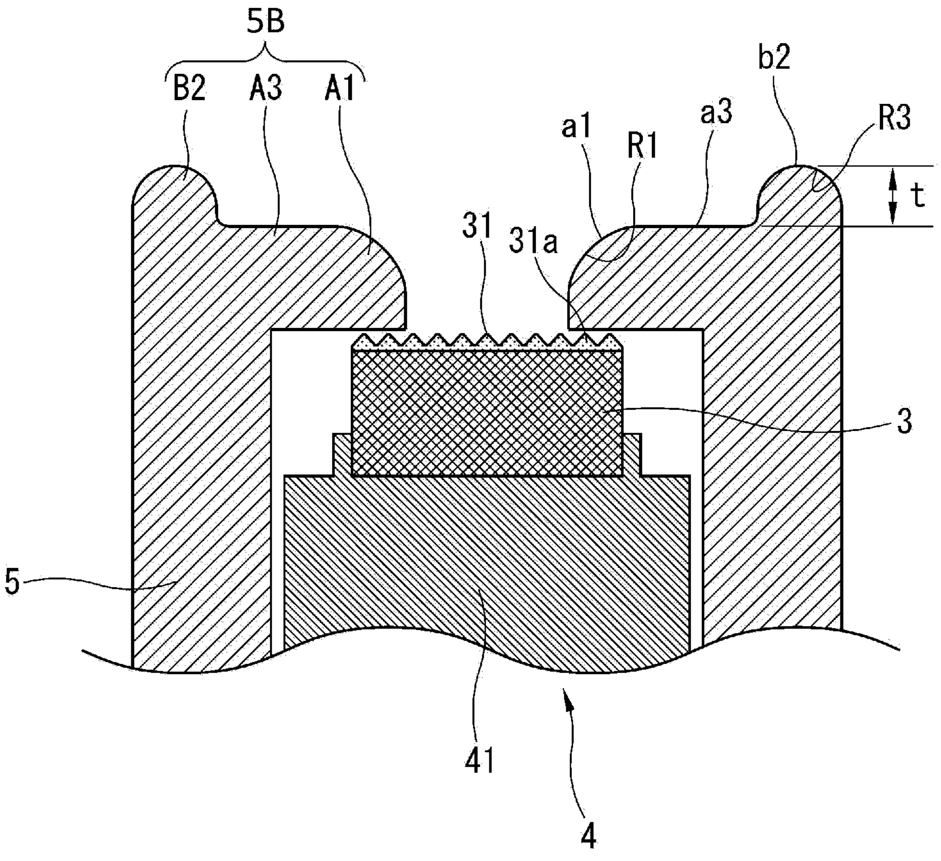
FIG. 7 is an enlarged view (sectional view corresponding to an enlarged view of part of FIG. 1) for explaining the guard electrode 5 and the surroundings of the guard electrode 5 in a second embodiment.

In a second embodiment, the X-ray device 10 is configured such that the guard electrode 5 includes a distal end section 5B as shown in FIG. 7.

Similar to the distal end section 5A in the first embodiment, the distal end section 5B of the guard electrode 5 shown in FIG. 7 includes a distal end inner-peripheral-side part A1, a distal end middle part A3 and a distal end outer-peripheral-side part B2 which is positioned on the outer peripheral side of the guard electrode 5, and has an outer-peripheral-side curved surface portion b2 convex to the both-end other side. The distal end outer-peripheral-side part B2 is configured so as to project more on the both-end other side than the distal end middle part A3.

In such a distal end section 5B, similar to the distal end section 5A, for example, the shape and the like of each of the distal end inner-peripheral-side part A1, the distal end outer-peripheral-side part B2 and the distal end middle part A3 can also be appropriately designed in accordance with the X-ray device 10 as an object.

For example, by appropriately changing the design of the flat surface width of the flat surface portion a3 of the distal end middle part A3 or appropriately changing the design of a curvature radius R3 or a projection length "t" of the outer-peripheral-side curved surface portion b2, the guard electrode 5 can be adjusted so as to obtain a desired emission characteristic. In addition, for example, by appropriately changing the design of the curvature radius R1 of the inner-peripheral-side curved surface portion a1, the guard electrode 5 can be adjusted so as to obtain a desired electron beam convergence performance.

In the distal end outer-peripheral-side part B2, if the projection length t is too long, an electric field tends to be concentrated. The projection length t is therefore set so as to be long within a range in which abnormal discharge which might occur, for example, at the distal end section 5B of the guard electrode 5 can be suppressed.

In addition, similar to the curvature radiuses R1 and R2, the size of the curvature radius R3 can be appropriately set as well. For example, when the size of the curvature radius R3 is set as "r3", it is set so as to satisfy the relational expression of $r1 \leq r3$.

According to the second embodiment shown above, in addition to working effects similar to those of the first embodiment, the following effects can be obtained. That is, in the distal end section 5B of the guard electrode 5, since the distal end outer-peripheral-side part B2 projects more on the both-end other side than the distal end middle part A3, electron beam convergence performance can be improved easier. In addition, by appropriately changing the design, for example, of the projection length t of the distal end outer-peripheral-side part B2, fine adjustment and the like of electron beam convergence performance becomes possible.

Third Embodiment

Figure 8:
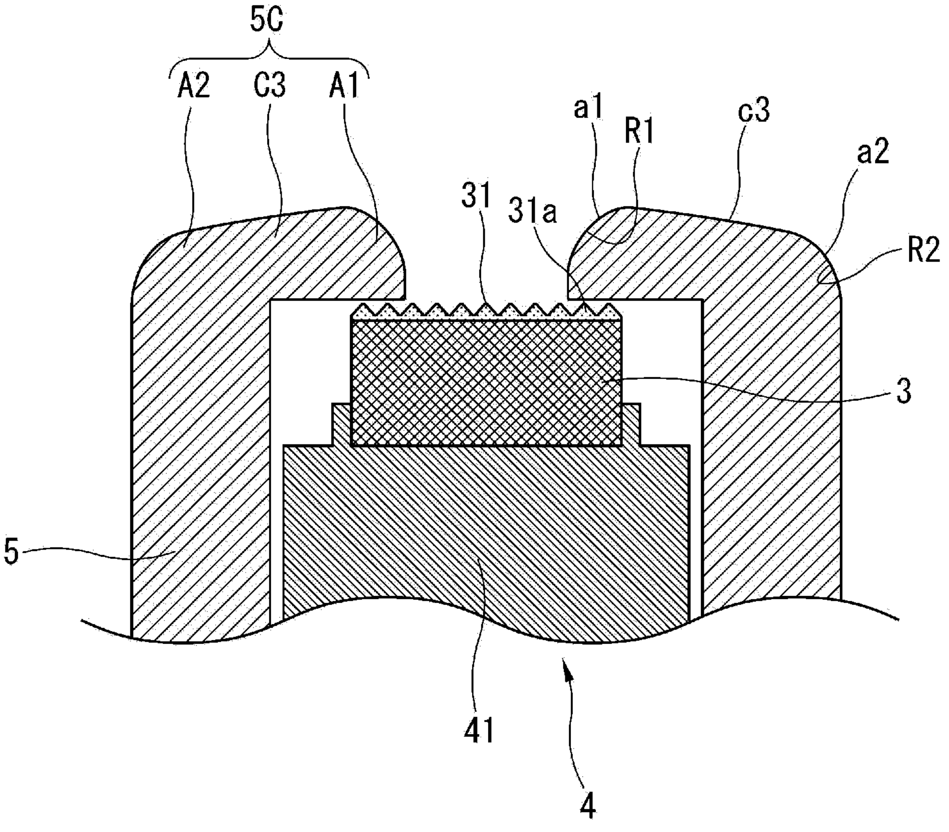
FIG. 8 is an enlarged view (sectional view corresponding to an enlarged view of part of FIG. 1, in case of a both-end-other-side inclined shape) for explaining the guard electrode 5 and the surroundings of the guard electrode 5 in a third embodiment.

In a third embodiment, the X-ray device 10 is configured such that the guard electrode 5 includes a distal end section 5C as shown in FIG. 8.

Similar to the distal end section 5A in the first embodiment, the distal end section 5C of the guard electrode 5 shown in FIG. 8 includes a distal end inner-peripheral-side part A1, a distal end outer-peripheral-side part A2 and a distal end middle part C3 which is positioned between the distal end inner-peripheral-side part A1 and the distal end outer-peripheral-side part A2, and has a flat surface portion c3 extending in the cross-sectional direction between the inner-peripheral-side curved surface potion a1 and the outer-peripheral-side curved surface portion a2.

The flat surface portion c3 is formed in a shape which extends in a direction crossing the axis of the guard electrode 5 at an inclined angle, such that a point on the flat surface portion c3 moves toward the both-end other side as it approaches the distal end inner-peripheral-side part A1 side from the distal end outer-peripheral-side part A2 side (in the following, this shape is simply referred to as a "both-end-other-side inclined shape"). Accordingly, the distal end inner-peripheral-side part A1 is positioned closer to the both-end other side than the distal end outer-peripheral-side part A2.

In such a distal end section 5C, similar to the distal end sections 5A and 5B, for example, the shape and the like of each of the distal end inner-peripheral-side part A1, the distal end outer-peripheral-side part A2 and the distal end middle part C3 can also be appropriately designed in accordance with the X-ray device 10 as an object.

For example, by appropriately changing the design of the flat surface width of the flat surface portion c3 of the distal middle part C3 or appropriately changing the design of a curvature radius R2 of the outer-peripheral-side curved surface portion a2, the distal end section 5C can be adjusted so as to obtain a desired emission characteristic. In addition, for example, by appropriately changing the design of the curvature radius R1 of the inner-peripheral-side curved surface portion a1, the distal end section 5C can be adjusted so as to obtain a desired electron beam convergence performance.

Figure 9:
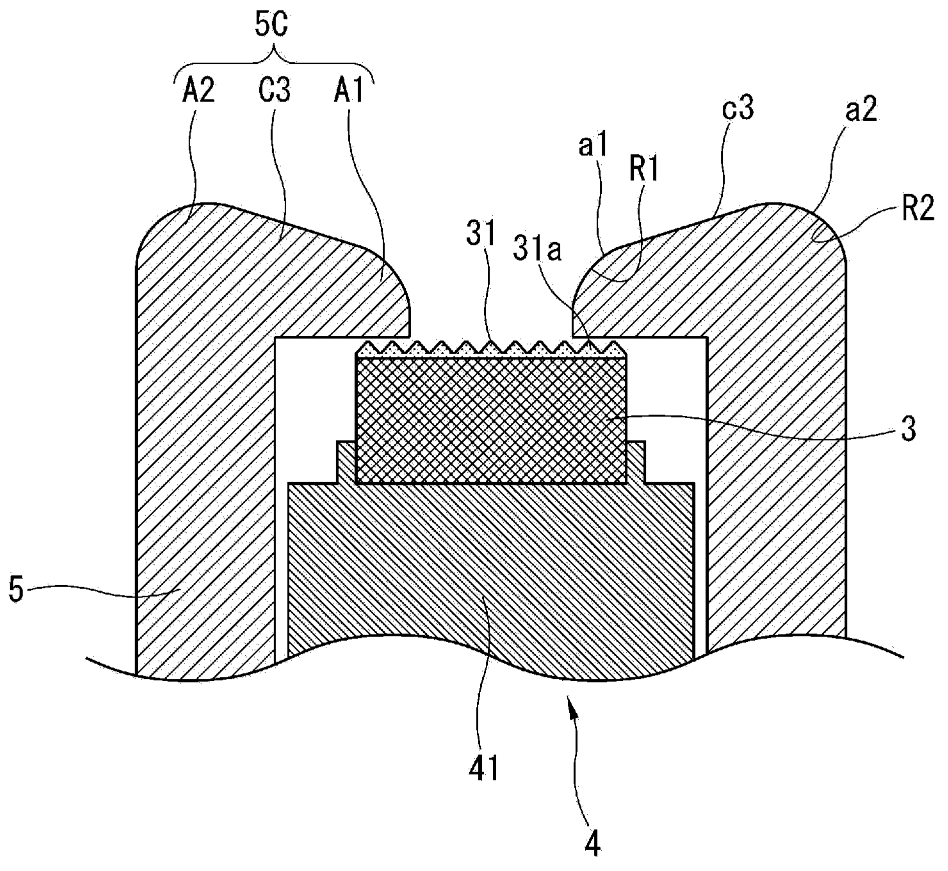
FIG. 9 is an enlarged view (sectional view corresponding to an enlarged view of part of FIG. 1, in case of a both-end-one-side inclined shape) for explaining the guard electrode 5 and the surroundings of the guard electrode 5 in the third embodiment.

The inclination angle of the flat surface portion c3 with respect to the axis of the guard electrode 5 can also be appropriately set. For example, as shown in FIG. 9, the flat surface portion c3 may be formed in a shape which extends in a direction crossing the axis of the guard electrode 5 at an inclined angle, such that a point on the flat surface portion 3*c* moves toward the both-end one side as it approaches the distal end inner-peripheral-side part A1 side from the distal end outer-peripheral-side part A2 side (in the following, this shape is simply referred to as a "both-end-one-side inclined shape"). In this case, the distal end inner-peripheral-side part A1 is positioned closer to the both-end one side than the distal end outer-peripheral-side part A2.

Figure 10:
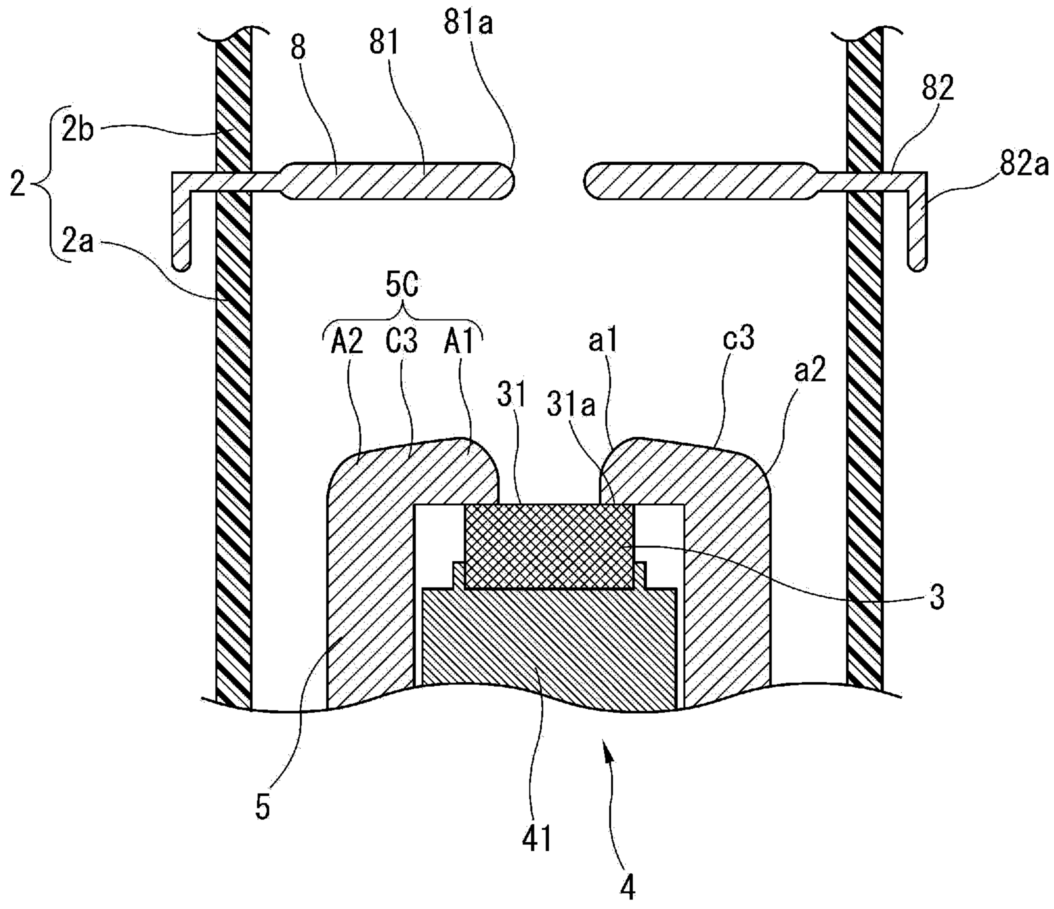
FIG. 10 is an enlarged view (sectional view corresponding to an enlarged view of part of FIG. 1, in case of an arc horn structure) for explaining the guard electrode 5 and the surroundings of the guard electrode 5 in the third embodiment.

According to the third embodiment shown above, in addition to working effects similar to those in the first embodiment and the second embodiment, the following effects can be obtained. That is, when the flat surface portion c3 of the distal end section 5C in the guard electrode 5 has a both-end-other-side inclined shape, for example, as shown in FIG. 10, even if the grid electrode 8 has an arc horn structure (structure in which a bent portion 82*a* is formed on the outer peripheral side of the vacuum vessel 11 of the lead terminal 82 in FIG. 10, so as to obtain an electric field relaxing effect), while suppressing local electric field concentration which may occur at the guard electrode 5, by appropriately changing the design of the distal end section 5C, an emission characteristic and electron beam convergence performance each can be adjusted as desired.

On the other hand, as shown in FIG. 9, when the flat surface portion c3 of the distal end section 5C in the guard electrode 5 has a both-end-one-side inclined shape, the distal end outer-peripheral-side part A2 is positioned closer to the both-end other than the distal end middle part C3, and, similar to the second embodiment, electron beam convergence performance is improved easier. Moreover, when a projection structure such as a distal end outer-peripheral-side part B2 in the second embodiment is not formed, as compared with the second embodiment, abnormal discharge which might occur, for example, at the distal end section 5C of the guard electrode 5 can be suppressed easier.

As the above, in the present invention, although the details only of the embodiments listed above have been explained, it is obvious for a skilled person that various changes and the like can be performed within a range of the technical ideas of the present invention, and such a change belongs to the scope of the claims.

For example, the first to third embodiments may be appropriately combined with each other. Specifically, the distal end outer-peripheral-side part A2 of the distal end section 5C of the guard electrode 5 in FIGS. 8 and 9 may be formed so as to project toward the both-end other side, similar to the distal end outer-peripheral-side part B2 of FIG. 7.

Moreover, by appropriately applying the contents in the patent documents 1 and 2, design change can be performed, so as to obtain working effects similar to those of the first to third embodiments.

The invention claimed is:

1. A field emission device comprising:

a vacuum vessel in which both ends of a cylindrical insulating body are sealed so as to form a vacuum chamber on an inner peripheral side of the insulating body;

an emitter positioned on one side of a direction toward the both ends in the vacuum chamber, and supported via a bellows which is expandable in the direction toward the both ends, so as to be movable in the direction toward the both ends; and a target positioned on an other side of the direction toward the both ends in the vacuum chamber, and provided so as to face the other side of the direction toward the both ends in the emitter, wherein the emitter is provided with an electron generation part on a side facing the target, and a guard electrode is provided on an outer peripheral side of the electron generation part of the emitter, wherein the guard electrode having a cylindrical shape and provided on the outer peripheral side of the electron generation part of the emitter comprises a distal end section positioned in an emission direction of an electron beam from the electron generation part, wherein the distal end section includes:

a distal end inner-peripheral-side part having an inner-peripheral-side curved surface portion convex to the emission direction, a distal end outer-peripheral-side part having an outer-peripheral-side curved surface portion convex to the emission direction, and a distal end middle part positioned between the distal end inner-peripheral-side part and the distal end outer-peripheral-side part, and having a flat surface portion between the inner-peripheral-side curved surface portion and the outer-peripheral-side curved surface portion, the flat surface portion extending in a direction therebetween;

wherein a grid electrode is provided between the emitter and the target in the vacuum chamber, and wherein the distal end outer-peripheral-side part projects in the emission direction more than the distal end middle part, so as to project in a convex shape in the emission direction.

2. The field emission device according to claim 1, wherein the grid electrode has an arc horn structure.

3. A field emission device comprising:

a vacuum vessel in which both ends of a cylindrical insulating body are sealed so as to form a vacuum chamber on an inner peripheral side of the insulating body;

an emitter positioned on one side of a direction toward the both ends in the vacuum chamber, and supported via a bellows which is expandable in the direction toward the both ends, so as to be movable in the direction toward the both ends; and a target positioned on an other side of the direction toward the both ends in the vacuum chamber, and provided so as to face the other side of the direction toward the both ends in the emitter, wherein the emitter is provided with an electron generation part on a side facing the target, and a guard electrode is provided on an outer peripheral side of the electron generation part of the emitter, wherein the guard electrode having a cylindrical shape and provided on the outer peripheral side of the electron generation part of the emitter comprises a distal end section positioned in an emission direction of an electron beam from the electron generation part, wherein the distal end section includes:

a distal end inner-peripheral-side part having an inner-peripheral-side curved surface portion convex to the emission direction, a distal end outer-peripheral-side part having an outer-peripheral-side curved surface portion convex to the emission direction, and a distal end middle part positioned between the distal end inner-peripheral-side part and the distal end outer-peripheral-side part, and having a flat surface portion between the inner-peripheral-side curved surface portion and the outer-peripheral-side curved surface portion, the flat surface portion extending in a direction therebetween;

wherein a grid electrode is provided between the emitter and the target in the vacuum chamber, and wherein the flat surface portion of the guard electrode extends in a direction crossing an axis of the guard electrode at an inclined angle, such that a point on the flat surface portion moves toward the other side of the direction toward the both ends as it approaches a distal end inner-peripheral-side part side from a distal end outer-peripheral-side part side.

4. The field emission device according to claim 3, wherein the grid electrode has an arc horn structure.

5. A field emission device comprising:

a vacuum vessel in which both ends of a cylindrical insulating body are sealed so as to form a vacuum chamber on an inner peripheral side of the insulating body;

an emitter positioned on one side of a direction toward the both ends in the vacuum chamber, and supported via a bellows which is expandable in the direction toward the both ends, so as to be movable in the direction toward the both ends; and a target positioned on an other side of the direction toward the both ends in the vacuum chamber, and provided so as to face the other side of the direction toward the both ends in the emitter, wherein the emitter is provided with an electron generation part on a side facing the target, and a guard electrode is provided on an outer peripheral side of the electron generation part of the emitter, wherein the guard electrode having a cylindrical shape and provided on the outer peripheral side of the electron generation part of the emitter comprises a distal end section positioned in an emission direction of an electron beam from the electron generation part, wherein the distal end section includes:

a distal end inner-peripheral-side part having an inner-peripheral-side curved surface portion convex to the emission direction, a distal end outer-peripheral-side part having an outer-peripheral-side curved surface portion convex to the emission direction, and a distal end middle part positioned between the distal end inner-peripheral-side part and the distal end outer-peripheral-side part, and having a flat surface portion between the inner-peripheral-side curved surface portion and the outer-peripheral-side curved surface portion, the flat surface portion extending in a direction therebetween;

wherein a grid electrode is provided between the emitter and the target in the vacuum chamber, and wherein the flat surface portion of the guard electrode extends in a direction crossing an axis of the guard electrode at an inclined angle, such that a point on the flat surface portion moves toward the other side of the direction toward the both ends as it approaches a distal end outer-peripheral-side part side from a distal end inner-peripheral-side part side.

6. The field emission device according to claim 5, wherein the grid electrode has an arc horn structure.

* * * * *